United States Patent
Oka

Patent Number: 6,159,033
Date of Patent: Dec. 12, 2000

[54] ELECTRICAL CONNECTION BOX

[75] Inventor: Yoshito Oka, Yokkaichi, Japan

[73] Assignee: Sumitomo Wiring Systems, Ltd., Yokkaichi, Japan

[21] Appl. No.: 09/332,505

[22] Filed: Jun. 14, 1999

[30] Foreign Application Priority Data

Jun. 16, 1998 [JP] Japan ................................. 10-168837

[51] Int. Cl.⁷ ................................................ H01R 13/627
[52] U.S. Cl. ............................................. 439/350; 439/76
[58] Field of Search .................................. 439/76.2, 350, 439/374, 377, 533, 527

[56] References Cited

U.S. PATENT DOCUMENTS

| | | | |
|---|---|---|---|
| 4,869,675 | 9/1989 | Ogawa | 439/76 |
| 5,730,617 | 3/1998 | Araki et al. | 439/374 |

FOREIGN PATENT DOCUMENTS

| | | |
|---|---|---|
| 0135910 | 4/1985 | European Pat. Off. . |
| 4227182 | 12/1993 | Germany . |
| 4429294 | 2/1996 | Germany . |
| 5-139273 | 6/1993 | Japan . |
| 10-41008 | 2/1998 | Japan . |

OTHER PUBLICATIONS

Patent Abstracts of Japan, vol. 17, No. 527, published Sept. 22,1993.
Patent Abstracts of Japan, vol. 1198, No. 06, published Apr. 30, 1998.

*Primary Examiner*—Paula Bradley
*Assistant Examiner*—Alexander Gilman
*Attorney, Agent, or Firm*—Greenblum & Bernstein, P.L.C.

[57] ABSTRACT

There is provided an electrical connection box configured to be smaller in size on which electrical components and an electronic control device are mounted such that production costs are reduced. A plurality of electrical component housing areas is provided on a surface of one side on an electric connection box. An electrical component is adapted to be mounted on the electrical component housing areas. A male type connector for mounting an electronic control device is provided on a surface of the electrical connection box. The electronic control device is connected with the electric connection box by connecting the male type connector with a female type connector provided in the electronic control device. The electronic control device is mounted off to an outer side of the electric connection box, and a supporting plate which supports an area of the electronic control device is cantilevered from, or shifted off to the outer side of, the electronic control device. Additionally, fastening elements are provided on at least one of the electrical connection box and the electronic control device.

12 Claims, 4 Drawing Sheets

(PRIOR ART)

ELECTRICAL CONNECTION BOX

BACKGROUND OF THE INVENTION

1. Field of the Invention

The present invention relates to an electrical connection box to be mounted with electrical components and an electronic control device on the surface of one side thereof.

2. Description of Background Information

Conventionally, an electrical connection box installed in an automobile engine compartment, such as the structure shown in FIG. 6, has been known. This electrical connection box 51 houses an electric circuit which is not illustrated herein. In addition, on the surface of one side on the electrical connection box 51, a plurality (9 pieces) of electrical component housing areas 52 is provided. By mounting here electrical components such as fuses, relays, etc., that are not illustrated here, the electrical components can be electrically connected with the above-mentioned electric circuit.

Furthermore, on one side of the above-mentioned election connection box 51 an electronic control device 53 is mounted, and is electrically connected with the above-mentioned electric circuit through a connection area 55. The electronic control device 53 performs a certain control by receiving power from the electric circuit based on the output sent from this electric circuit other than the power source.

In the structure thus provided with the electronic control device 53 on the surface of one side on such an electrical connection box 51, a plurality of electrical component housing areas 52 (electrical components) is provided with a necessary number of areas (in this case, 9 pieces) at a position where a space 54 occupied by the electronic control device 53 is excluded, as shown in FIG. 6. Therefore, a connection area 55 where the electronic control device 53 is electrically connected with the above-mentioned electric circuit only occupies a portion of the occupied area 54. However, the surface of one side on the electric connection box 51 had to be widened due to the occupied area 54. Therefore, the electric connection box 51 had to be made larger in scale, making it necessary to increase the production costs.

The present invention was made in view of the above circumstances, and the object of the present invention is to reduce the size of an electric connection box on which electrical components and electric control device are mounted, thereby reducing production costs.

SUMMARY OF THE INVENTION

In order to achieve the above object, in a first aspect of the present invention, the above-mentioned electronic control device is shiftedly mounted off to an outer side of the electrical connection box in an electrical connection box to be mounted with electrical components and an electronic control device on the surface of one side.

In another aspect of the invention, a supporting plate is provided on one side of the electrical connection box which supports an area shifted off to an outer side of the electronic control device on the surface of one side on the electric connection box.

According to a further aspect of the invention, the electrical connection box is provided with at least one fastening member for fastening the electronic control device to the above-mentioned supporting plate in compliance with the above-mentioned electronic control device.

In another aspect of the present invention, the electronic control device is mounted by at least one fastening member to an upper surface of the electrical connection box in a cantilever fashion, without an above-mentioned supporting plate therebelow.

DETAILED DESCRIPTION OF THE PREFERRED EMBODIMENTS

Description follows of a first embodiment of the present invention which is embodied in an electrical connection box to be provided, for example, in an automobile engine compartment.

The electrical connection box 11 houses therein an electric circuit, which is not illustrated herein. On the upper surface of the electrical connection box 11, a plurality (9 pieces in the present embodiment) of electrical component housing areas 12 are provided. By mounting on the electrical component housing areas 12, a fuse relay, and other suitable electrical components which are not illustrated, the electrical components are electrically connected with the above-mentioned electrical circuit.

Figure 1:
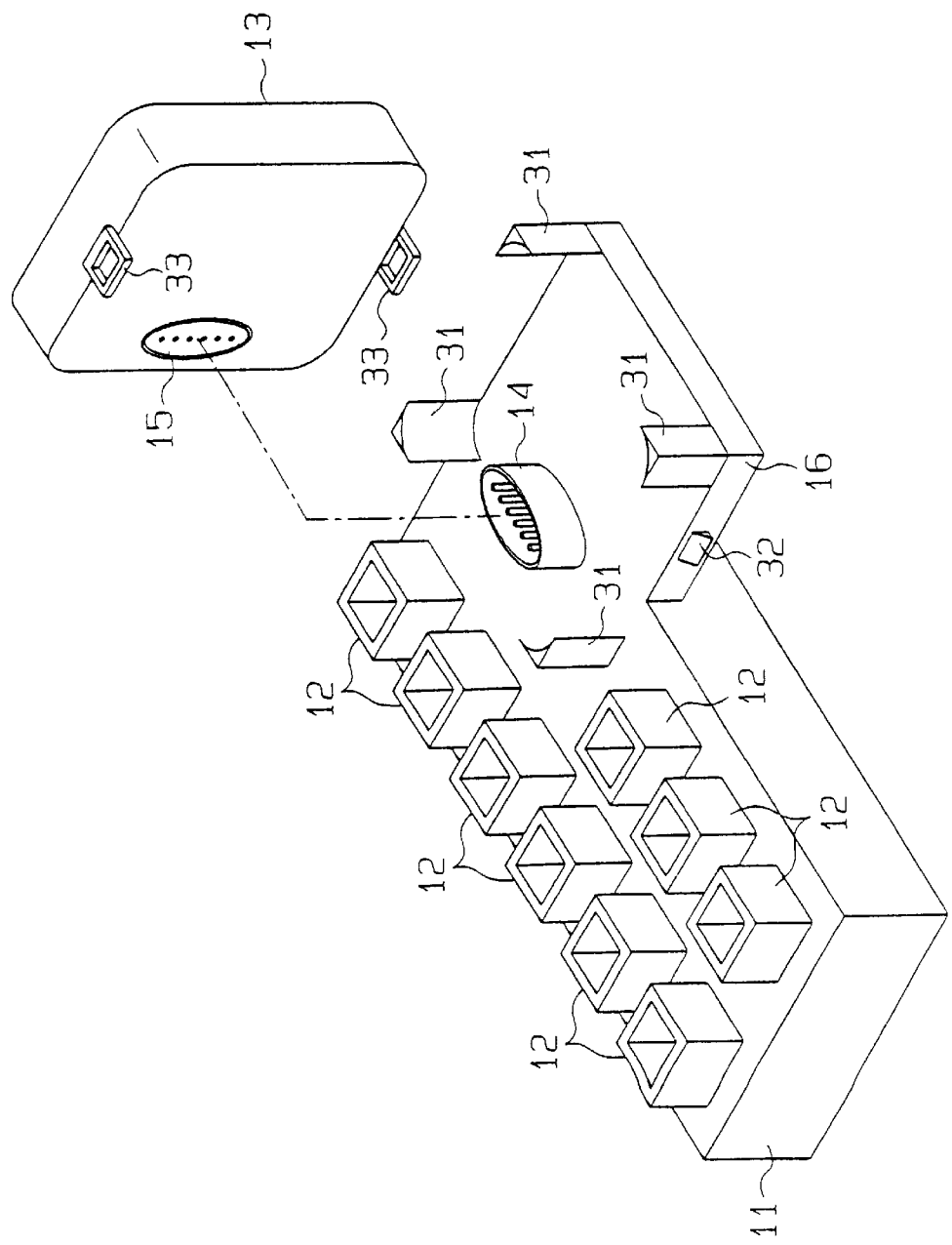
FIG. 1 is an exploded perspective view showing a first embodiment of the electrical connection box of the present invention.
Figure 2:
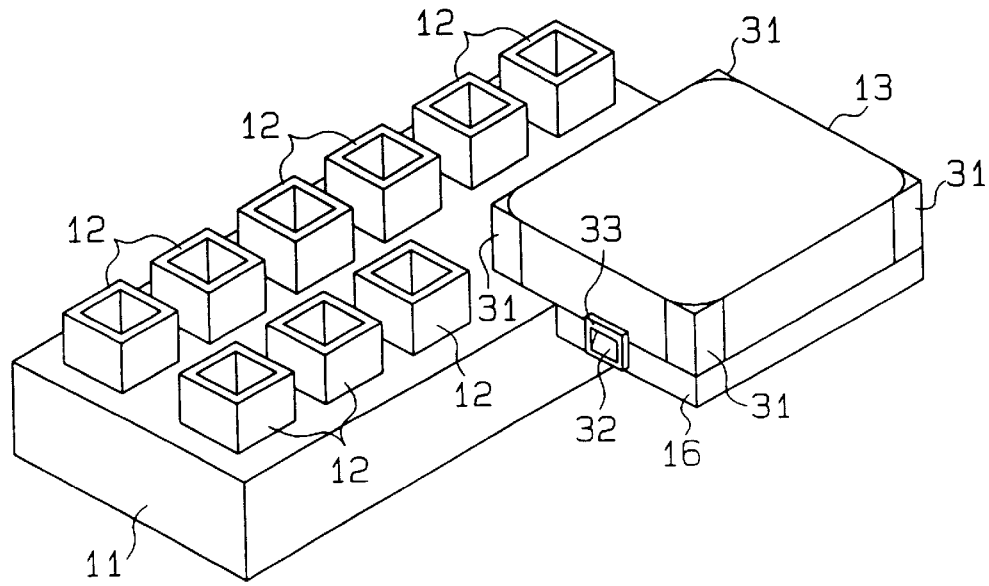
FIG. 2 is a perspective view showing the first embodiment of the present invention.

On the electrical connection box 11 in the first embodiment, a supporting plate 16 which protrudes from an outer side of the electrical connection box 11 is unitarily formed therewith. As can be seen in FIGS. 1 and 2, the supporting plate 16 extends past the side wall of the electrical connection box 11 in a cantilever fashion, and the supporting plate 16 has a thickness that is substantially less than the thickness of the electrical connection box 11 (i.e., less than half the thickness as shown in FIGS. 1 and 2. A total of four sets of interfit elements 31, as one form of fastening members, are formed on the surface of supporting plate 16 on the electrical connection box 11.

Figure 3:
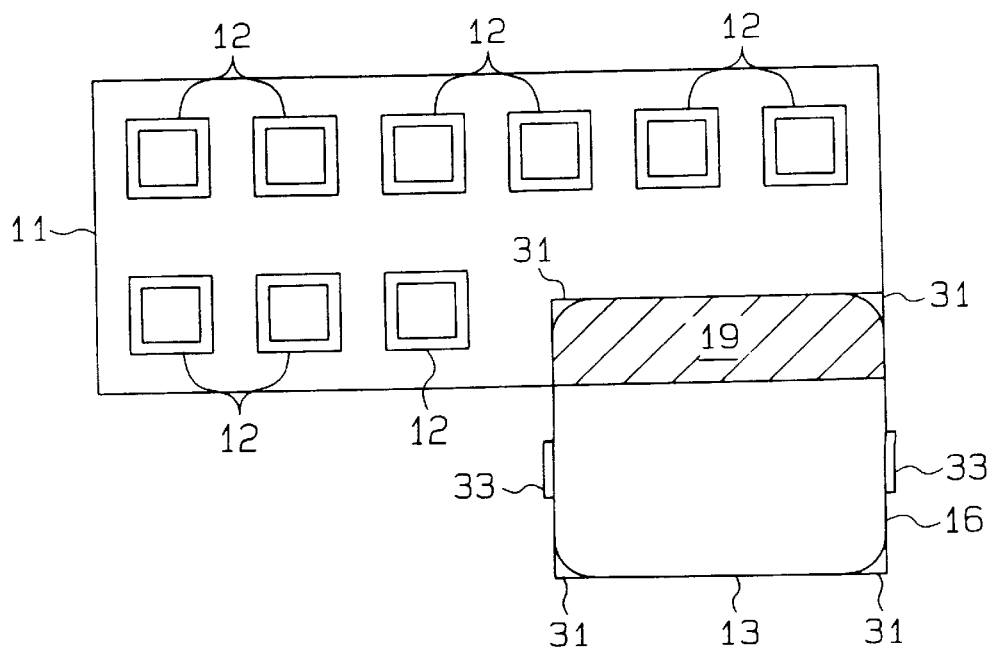
FIG. 3 is a plan view showing the first embodiment.

As seen in FIGS. 1–3, interfit elements 31 project upwardly from the upper surface of the electrical connection box 11 and from the upper surface of supporting plate 16 a sufficient distance to retain the electronic control device 13. The interfit elements 31 may be formed unitarily with the respective electrical connection box 11 and supporting surface 16, or they may be separately formed and attached thereto in any conventional manner. Although interfit elements 31 are depicted in FIG. 2 to extend to the same level as the upper surface of the electronic control device 13, the interfit elements may extend above or below the upper surface of the electronic control device 13. Also, although four such interfit elements are depicted in FIGS. 1–3, any desired number of interfit elements 31 may be provided.

Furthermore, the inner surfaces of the interfit elements 31 are configured to have a complementary shape with the corners of the electronic control device 13 and to fit snugly therewith as seen in FIGS. 2 and 3, and while the inner surfaces of interfit elements 31 and corners of the electronic control device 13 are shown to have complementary curved surfaces, the complementary surfaces may take any shape, for example right-angle shaped. Additionally, the inner surfaces of the interfit elements 31 may include downwardly and inwardly (toward the center of the supporting plate 16) tapered surfaces such that a wedging of the electronic control device takes place during installation thereof. Alternatively, the downward tapering surfaces for providing the wedging action may be provided on the electronic control device 13 or on both the interfit elements 31 and on the electronic control device 13. Moreover, the fit between the interfit elements 31 and the electronic control device 13 can vary. For example, the fit may be tight at the bottom and loose at the top, or vice versa.

Furthermore, on one side of the electrical connection box 11, a male connector 14 having a plurality of terminals is provided which is configured to cooperate with a corresponding female connector 15 on the electronic control device. Also, in the embodiment of the electronic control device 13 depicted in FIG. 1, a female connector 15 to be connected in accordance with the male connector 14 is provided. The cooperating connectors 14, 15 have been depicted in FIG. 1 as having a generally oval shape, but they may have any desired shape. Moreover, although only one set of cooperating connectors 14, 15 is depicted in FIG. 1, any desired number of sets of cooperating connectors may be provided. Of course, the female connector 15 can alternatively be provided on electrical connection box 11, with the male connector 14 provided on the electronic control device.

In addition, on the surface of two opposite sides of the supporting plate 16, a securing hook 32 which protrudes towards the outer side is provided (only one of which can be seen in FIG. 1). On the electronic control device 13 to be mounted on the surface of one side on the electrical connection box 11, a pair of securing elements 33, which cooperate with the securing hooks 32, are provided. In the present case, the securing hooks 32 and the securing elements 33 are formed as one of the fastening members. However, any suitable fastening member for retaining the electronic control device 13 on the supporting surface 16 may be utilized.

With the structure thus described, in mounting the electronic control device 13 on the electrical connection box 11, the electronic control device 13 is fastened onto the surface of one side on the electrical connection box 11, with four corners of the electronic control device 13 interfitting with the interfit elements 31, and with both the securing hooks 32 and the securing elements 33 engaged.

In addition, with the male connector 14 and the female connector 15 connected, the side mounted electronic control device 13 obtains an electric power source from the above-mentioned electric circuit, thus carrying out a certain control based on a signal outputted from the electric circuit different from the power supply.

Figure 6:
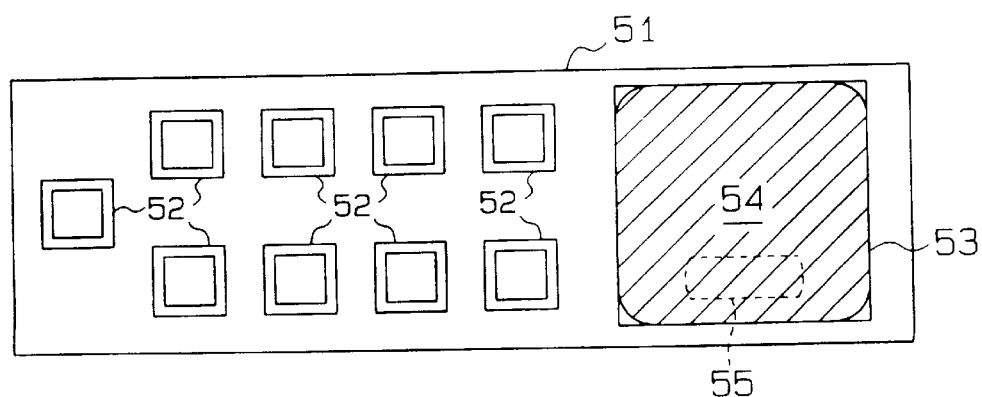
FIG. 6 is a plan view showing a conventional electrical connection box.

With the first embodiment, the electronic control device 13 is mounted off to the outer side of the electrical connection box 11, and an area shifted off to the outer side of the electronic control device 13 is supported by the supporting plate 16. Therefore, as shown in FIG. 3, the area 19 occupied by the electronic control device 13 on the upper surface of the electrical connection box 11 is reduced, as compared with the prior art device depicted in FIG. 6.

From the above, the following results are obtained based on the first embodiment of the present invention:

(1) By decreasing the area 19 occupied by the electronic control device 13 on the upper surface of the electrical connection box 11, the upper surface of the electrical connection box 11 can be made narrower, thereby permitting the electric connection box to be made smaller in size and thus reducing the cost.

(2) The area of the electronic control device 13 shifted off to the outer side can be supported by an extremely simple structure. In addition, in mounting the electronic control device 13 on the electrical connection box 11, the electronic control device 13 can be fastened onto the surface of one of the electrical connection box 11 by interfitting four corners of the electronic control device 13 onto the interfit elements 31 and by connecting the securing hooks 32 and the securing elements 33 formed on the electronic control device 13. Because the electronic control device 13 can be supported in such a stabilized condition, any damage to the connectors 14 and 15 resulting from shaking or vibration of the electronic control device 13 can be avoided.

The present embodiment is not limited to the above areas alone, but various modifications are also contemplated. For example, although the supporting plate 16 of the first embodiment is provided on the electrical connection box 11 in a unitary manner, the supporting plate 16 may be provided as a separate unit connected to the electrical connection box 11.

With the present embodiment, although a pair of securing hooks 32 and securing elements 33 for securing the interfit elements 31 interfitting with the four corners of the electronic control device 13 and the electrical connection box 11 was provided, at least one of the pairs of securing hooks 32 and securing elements 33, and/or at least one of the interfit elements 31, may be omitted.

Figure 4:
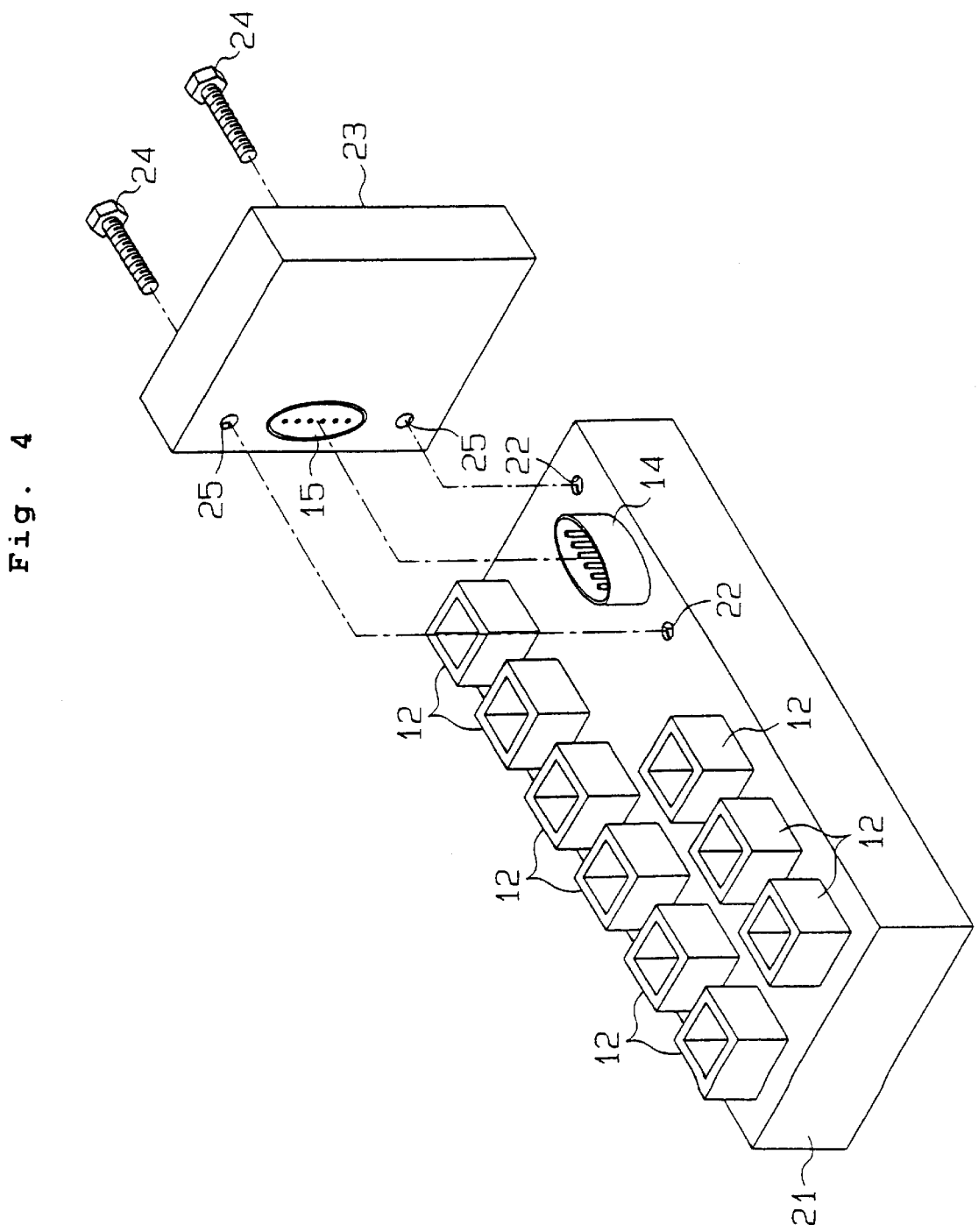
FIG. 4 is an exploded perspective view showing a second embodiment of an electrical connection box according to the present invention.
Figure 5:
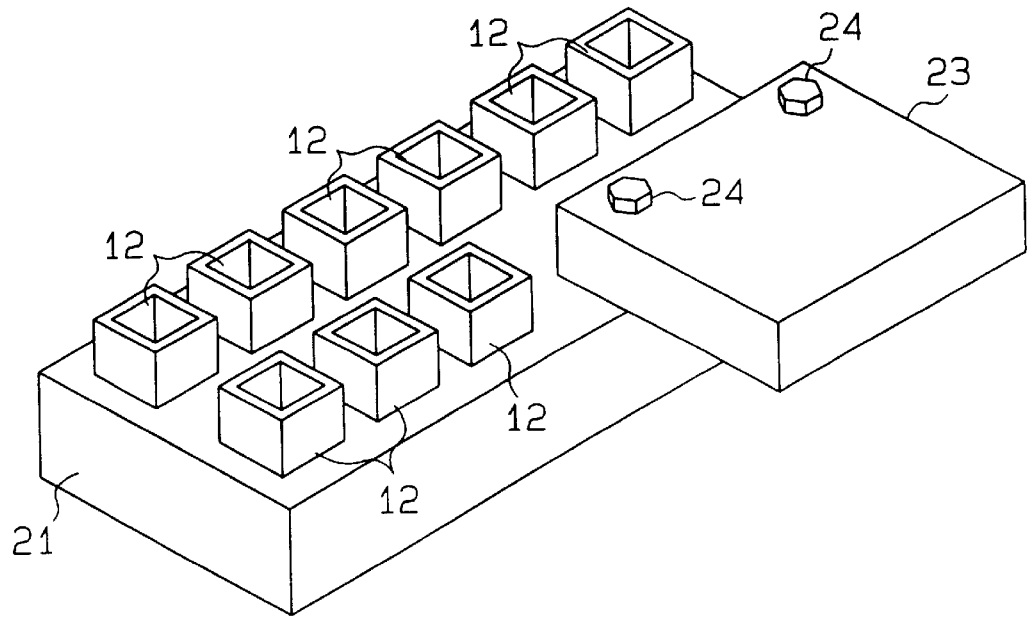
FIG. 5 is a perspective view showing the second embodiment of the present invention.

Description follows below of a second embodiment of the present invention of an electrical connection box provided, for example, in engine compartments of automobiles, with reference to FIG. 4 and FIG. 5. In this case, for the elements which are common to the above-mentioned first embodiment, the common elements have been given the same reference characters, but further description has been omitted.

With the present embodiment, in the same manner as the case of the above-mentioned first embodiment, an electronic control device 23 is mounted off to an outer side of an electric connection box 21. However, in place of the above-mentioned supporting plate 16, interfit elements 31, and peripheral structure, a pair of bolts 24 for securing an electronic control device 23 onto the surface of one side on the electrical connection box 21 is provided, which is different from the above-mentioned first embodiment. On the surface of one side on the electrical connection box 21, bolt receiving holes 22 are provided for receiving the bolts 24. The holes 22 may be threaded, or formed in any suitable manner to securely receive the threads of the bolts 24. In addition, on the control device 23, bolt through-holes 25 for inserting the bolts 24 are provided. The bolts 24 are tightened onto the holes 22 through the bolt through-holes 25. In this way, the electronic control device 23 is firmly fastened on the surface of one side on the above-mentioned electrical connection box 21. Although two bolts 24 have been depicted in this embodiment, any suitable number may be used.

As mentioned above in detail, according to the second embodiment, the results mentioned below can be obtained in addition to the same results as in cases (1) and (2) in the above-mentioned first embodiment. That is, with use of bolts 24 which have an extremely simple structure, the electronic control device 23 can be firmly fastened to the electric connection box 21.

In this case, the present embodiment is not limited to the scope of the description mentioned above, but may be modified as follows. With the present embodiment, the electronic control device 23 is fastened onto the electric connection box 21 by the bolts 24. However, the invention may be carried out, for instance, by using other fastening members such as pins or the like. Furthermore, although two bolts 24 have been illustrated in this embodiment, any suitable number of bolts 24, or other fastening elements, may be used, and the bolts and pins can be used in any suitable combination.

As elements which can be modified common to the respective embodiments as above-mentioned, some are described hereafter. With each of the embodiments mentioned above, a structure provided with nine electrical component housing areas 12 was shown. However, this is only one example, and the electrical connection box may be provided with any desired number of electrical component housing areas in accordance with the electric circuit employed.

With the embodiments mentioned above, a structure provided with only one electronic control device 13 or 23 has been shown. However, a plurality of such devices may be provided. And, at least one set of electronic control devices may be provided off to the side of an electric connection box.

An electronic control device 13 or 23 can be shifted off to the outer side of electric connecting box 11 or 21, and it is not always necessary to support the electronic control device 13 or 23 with the above-mentioned supporting plate 16 or to fasten it with the above-mentioned bolts 24.

The technical concept other than the claims that can be obtained from the above-mentioned embodiments follows below together with the results obtainable therefrom:

With the electric connection box according to one aspect of the present invention, the electronic control box is provided to the electrical connection box by use of bolts. According to this structure, by use of a bolt structure which is extremely simple, the electronic control device can be fastened to the electrical connection box.

According to another aspect of the present invention as set forth herein, an electrical connection box can be made smaller in size, thereby making it possible to reduce production costs.

Furthermore, with the invention as set forth in the second embodiment of the present invention, a supporting plate is provided, which structure is extremely simple and can support an area shifted off to the outer side of the electronic control device. Because the electronic control device is supported in a stable condition, any damage can be avoided to, for example, the electric connection area between the electrical connection box and the electronic control device resulting from shaking or vibration of the electronic control device.

With the present invention, the electronic control device can be firmly fastened to the electrical connection box by fastening members. Therefore, any damage to the connection between the electrical connection box and the electronic control device resulting from shaking or vibration of the electronic control device can be avoided.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 10-168837 filed on Jun. 16, 1998, which is herein expressly incorporated by reference in its entirety.

What is claimed:

1. An electrical connection box configured to mount electrical components and an electronic control device on a surface to one side thereof, said electrical connection box comprising:

mounting structure to mount the electronic control device to an outer side of said electrical connection box so that a major portion of the electronic control device projects past a side wall of said electrical connection box in a cantilever fashion, said mounting structure having a thickness substantially less than that of adjoining portions of said electrical connection box.

2. An electrical connection box as set forth in claim 5, wherein said mounting structure further comprises at least one securing hook provided on said supporting plate to cooperate with a corresponding securing element on the electronic control device to retain the electronic control device in position on said supporting plate.

3. An electrical connection box as set forth in claim 1, wherein said mounting structure comprises at least one fastening member provided to fasten the electronic control box to said electrical connection box such that the major portion of the electronic control box projects without additional support structure positioned therebelow.

4. An electrical connection box as set forth in claim 3, wherein said at least one fastening member comprises a threaded fastener that extends through the electronic control device and engages within a corresponding aperture in said electrical connection box.

5. An electrical connection box as set forth in claim 1, wherein said mounting structure comprises:

a supporting plate provided on a side area of said electrical connection box for supporting an area of the electronic control device positioned off to the outer side of said electrical connection box and extending past said side wall in a cantilever fashion therefrom, said supporting plate having said thickness less than the thickness of said electric connection box.

6. An electrical connection box as set forth in claim 5, wherein said mounting structure further comprises:

at least one fastening member provided to fasten the electronic control device to said supporting plate.

7. An electrical connection box as set forth in claim 5, wherein said mounting structure comprises:

a plurality of interfit elements provided on said supporting plate to extend upwardly therefrom, each said interfit element including a surface configured to interfit with the electronic control device to retain the electronic control device in position.

8. An electrical connection box as set forth in claim 7, wherein said mounting structure further comprises at least one securing hook provided on said supporting plate to cooperate with a corresponding securing element on the electronic control device to retain the electronic control device in position on said supporting plate.

9. An electrical connection box as set forth in claim 7, wherein said interfit elements are provided at spaced locations positioned about a periphery of said support plate.

10. An electrical connection box as set forth in claim 9, wherein the complementary surfaces of said interfit elements and said electronic control device are configured to provide a wedging action upon insertion of the electronic control device.

11. An electrical connection box as set forth in claim 9, wherein said surface of each said interfit element has a shape complementary to a corresponding portion of the electronic control device that interfits therewith.

12. An electrical connection box as set forth in claim 11, wherein said surface of each said interfit element is configured to provide a wedging action upon insertion of the electronic control device.

* * * * *